3,125,416
METHOD FOR PRODUCING HIGH PURITY MONOCRYSTALLINE BERYLLIA FIBERS AND PLATELETS

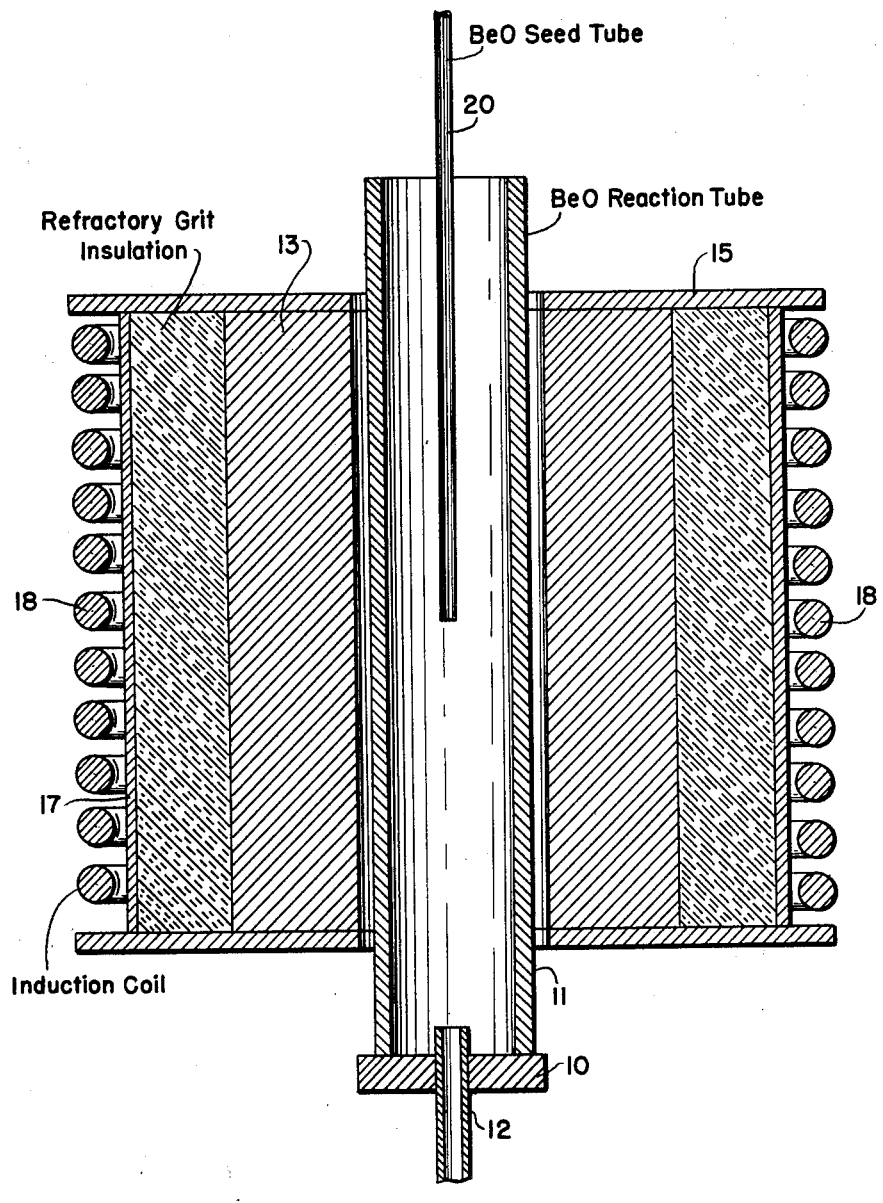

Eugene I. Ryshkewitch, Ridgewood, and Allen R. Sheets, Haskell, N.J., assignors to National Beryllia Corp., Haskell, N.J., a corporation of New Jersey
Filed Mar. 7, 1962, Ser. No. 178,125
3 Claims. (Cl. 23—183)

This invention relates to a process for obtaining high strength single crystal fibers and platelets of beryllia. Such monocrystalline fibers and platelets, which have tensile strengths of up to 2–3 million p.s.i., are especially useful as reinforcing additions to ceramics, metal plastics and other construction materials.

Among the objects of the invention is to provide a method for rapidly obtaining or growing such single crystals of beryllia.

Normally prepared or natural bulk crystals of practically all solids reveal extremely numerous, although mostly invisible flaws, cracks, inclusions, impurities, distortions, and other imperfections, with the effect that the chemical, electrical and mechanical resistivity of such crystals is several orders of magnitude below the theoretical so-called "molecular" value.

It is recognized that chemically as pure as possible and physically very small, single crystals are relatively free from such imperfections, and, therefore, reveal properties approaching the values of ideal flawless crystals.

Rapid solidification of a substance, e.g., beryllium oxide, from its gaseous state is, in principle, most effective for producing very thin crystals, substantially extending in one dimension (whiskers, fibers, fine needles), or in two dimensions (platelets, flakes) but not in all three directions or dimensions.

Since the vapor pressure of beryllium oxide is extremely low even at such high temperatures as 1800–2000° C., the process of solidification from its flowing vapor, e.g., by a suitable cooling, for instance, in a gradient furnace will produce only an extremely small, even invisible amount of BeO crystals, even over a prolonged period of time.

This invention is based on the discovery that beryllia single crystals may be more rapidly grown by first converting the beryllia to a relatively metastable compound which vaporized at a lower temperature than beryllia, but which reverts back to beryllia as it is deposited (at the temperatures involved).

The objects of the invention are attained by heating the beryllia in the presence of water vapor whereby the following reaction takes place:

$$BeO(s) + H_2O(v) = Be(OH)_2(v)$$

The reverse reaction readily takes place to deposit BeO as follows:

$$Be(OH)_2(v) = BeO \text{ (fine crystals)} + H_2O(v)$$

Although beryllia is chemical stable at elevated temperatures in dry atmospheres, it is corroded by moist atmospheres above 1200° C. The extent to which this corrosion proceeds is dependent upon such conditions as temperature, time, density of the beryllia, amount of moisture present, velocity of gas flow, and nature of carrier gases used in conjunction with the moisture. The corrosion process results from the formation of a gaseous Be—$H_2O$ complex reaction product, which decomposes again to leave a deposit of high purity beryllia.

In the drawing, the figure shows a side cross sectional view of an apparatus particularly well suited for carrying out the process of the invention.

In the apparatus, a refractory plate 10, is provided for supporting a tube 11. Either this tube, powder or other solid beryllia may act as the source of beryllia for the process. The plate 10, which may also be made of BeO, is fitted with an inlet tube 12 for admitting a gas which includes water vapor. The upper portion of the tube 11 is surrounded by suitable heating means comprising the refractory end plates 14 and 15, the tubular graphite susceptor tube 13, the insulating filling 16, the asbestos and/or mica paper sleeve and the induction coil 18.

Suspended from above, by suitable means (not shown) is a beryllia seed tube 20.

To carry out the process of the invention with this apparatus, the beryllia tube 10 is heated to about 1800° or more by the induction furnace device such as shown. The tube 11 is preferably made of high purity BeO. The seed tube 20 is also of pure BeO and is inserted in the furnace from the top. The rate of growth of fibers and platelets of BeO on the tube 20 depends on the temperature of tube 11, the amount of moisture in the gas entering tube 12, the nature of the carrier gas for the water vapor, etc. Any gas which does not react with BeO or water vapor at the temperature of treatment may be employed as a carrier gas for the water vapor although it is preferred to employ totally inert gases such as N, He, A, Kr, cracked ammonia, etc., to avoid problems with auxiliary equipment, etc.

High purity monocrystalline beryllia fibers and platelets may be grown, according to the invention, under the following conditions:

| | Preferred | Operable Range |
|---|---|---|
| Temperature | 1,800 to 2,000° C | 1,200° C. or more. |
| Time | 1 to 6 hours | 1 or more hours. |
| Gas Flow Rate | 0.6 to 2.5 l./min | 0.5 to 25 l./min. |
| Percent Water in Gas | 45 to 100% | 35 to 100%. |
| Carrier Gases | Nitrogen, helium, none (pure stream) any inert gas. | |
| Velocity of Gas in Tube | 1,600 to 2,500 cm./min. | 500 to 4,000 cm./min. |

The temperature along the seed tube varies from the lower end which is approximately at the temperature of tube 11 to a much lower temperature at the opposite end. Temperature appears to have the greatest single effect on the speed with which monocrystalline fibers and platelets are grown. The nature of the product, that is, whether fibers or platelets are the predominant growth form, is effected by the carrier gas employed, as well as the temperature at which the reaction proceeds. Conditions under which nitrogen is the carrier gas usually result in production of monocrystalline fibers, whereas helium results in a predominance of monocrystalline platelets. The platelets always appear at slightly higher temperatures than do the fibers, as determined by their relative positions on the seed tube.

The following specific examples further illustrate the process of the invention:

Example 1

The apparatus is constructed as shown in the drawing. The tube 11 is heated to approximately 1900° C. by coil 18, etc. A gas mixture consisting essentially of 52.4% water vapor and the remainder nitrogen is forced through tube 12 at a rate of approximately 2 liters/min. These conditions are maintained for approximately 6 hours. Upon removing tube 20 from the reaction zone it was found that it contained monocrystalline beryllia fibers of an average length of 6 mm. and included no platelets.

*Example 2*

The process was conducted as in Example 1 except that helium was substituted as the carrier gas. Fibers averaging 8 mm. in length as well as platelets of hexagonal form with diameters up to 5 mm. and a thickness of a few microns, were obtained.

In Examples 1 and 2, the tube 11 had an internal diameter of about 4½ cm. and a length of about 40 cm. It is obvious, however, that the process operates in the same way with larger or longer tubes and/or with clusters of tubes 11 and 20.

The features and principles underlying the invention described above in connection with specific exemplifications will suggest to those skilled in the art many other modifications thereof.

We claim:

1. Process for the production of monocrystalline beryllia fibers and platelets comprising heating beryllia to from 1200° C., to about 2000° C., in a confined space and in the presence of a carrier gas containing about 35 to 100% of water vapor whereby a gas mixture containing Be(OH)$_2$ vapors is obtained, passing the resultant vapors directly over a surface maintained at a temperature somewhat below that of said beryllia, said surface comprising seed crystals of beryllia.

2. The process as claimed in claim 1, wherein said beryllia is in the form of finely divided powder.

3. The process as claimed in claim 2, wherein said beryllia powder is heated to 1800–2000° C.

References Cited in the file of this patent

UNITED STATES PATENTS

| | | |
|---|---|---|
| 2,759,803 | Dauncey | Aug. 21, 1956 |
| 2,773,750 | Conant | Dec. 11, 1956 |
| 2,912,311 | Mason et al. | Nov. 10, 1959 |
| 3,025,137 | Murray et al. | Mar. 13, 1962 |
| 3,043,667 | Manning | July 10, 1962 |